Nov. 14, 1961 A. M. MASTERS 3,008,249

MOUNTING MEANS FOR A BOARD

Filed Dec. 7, 1953 2 Sheets-Sheet 1

INVENTOR.
ALBERT M. MASTERS
BY
Bohleber, Fassett & Montstream
ATTORNEYS

Nov. 14, 1961 A. M. MASTERS 3,008,249

MOUNTING MEANS FOR A BOARD

Filed Dec. 7, 1953 2 Sheets-Sheet 2

INVENTOR.
ALBERT M. MASTERS
BY
Bohleber, Fassett & Montstream
ATTORNEYS 3,008,249

MOUNTING MEANS FOR A BOARD

Albert M. Masters, Pen Argyl, Pa., assignor to A. M. Masters & Son, Pen Argyl, Pa., a partnership Filed Dec. 7, 1953, Ser. No. 396,683
9 Claims. (Cl. 35—63)

The invention pertains to a mounting means used in securing a board to a wall such as chalkboard, corkboard and the like. The invention also includes a mounting means for two boards such as a chalkboard and a corkboard when the latter is provided closely adjacent to a chalkboard.

Plastered walls in schools are usually no longer provided on walls upon which chalk, cork and similar boards are mounted. The assembly and mounting means to be described are applicable both to plastered walls and unplastered walls which usually are of cinderblock. The assembly and mounting means may dispense with the use of framing as heretofore used and also dispenses with screw adjusted clamps as heretofore used. As a consequence, the new mounting and assembly utilizes fewer parts and is much quicker to assemble in that one less part is required to be attached and there is no screwing of clamping means in order to securely anchor the board or boards in place.

It is an object of the invention to construct a board assembly which is simpler to construct and assemble than those heretofore used.

Another object of the invention is to use a flexible clamp which can be flexed and anchored by the use of pliers or other tools to firmly secure a chalkboard, corkboard or the like to a wall.

Another object is to provide new forms of mounting means for a board or boards.

A still further object is to construct the mounting means so that it is adaptable for different thicknesses of boards.

Another object is to provide a new mounting means for securing two boards in adjacent relation.

Again a mounting means is provided which does not use a screw adjusting or tightening clamp.

Other objects of the invention will be more apparent from the following description when taken in connection with the accompanying drawings illustrating some preferred constructions thereof in which.

A board such as a chalkboard, corkboard and the like particularly as used in schools is secured to a wall mounting means which may be a series of spaced mounting means. The walls may be plastered although usually schoolroom walls are of cinderblock without plaster. The assembly and mounting means may be used to secure the board or boards to walls whether plastered or unplastered and to wall studding.

Figures 1, 2, 3, 4, 5:
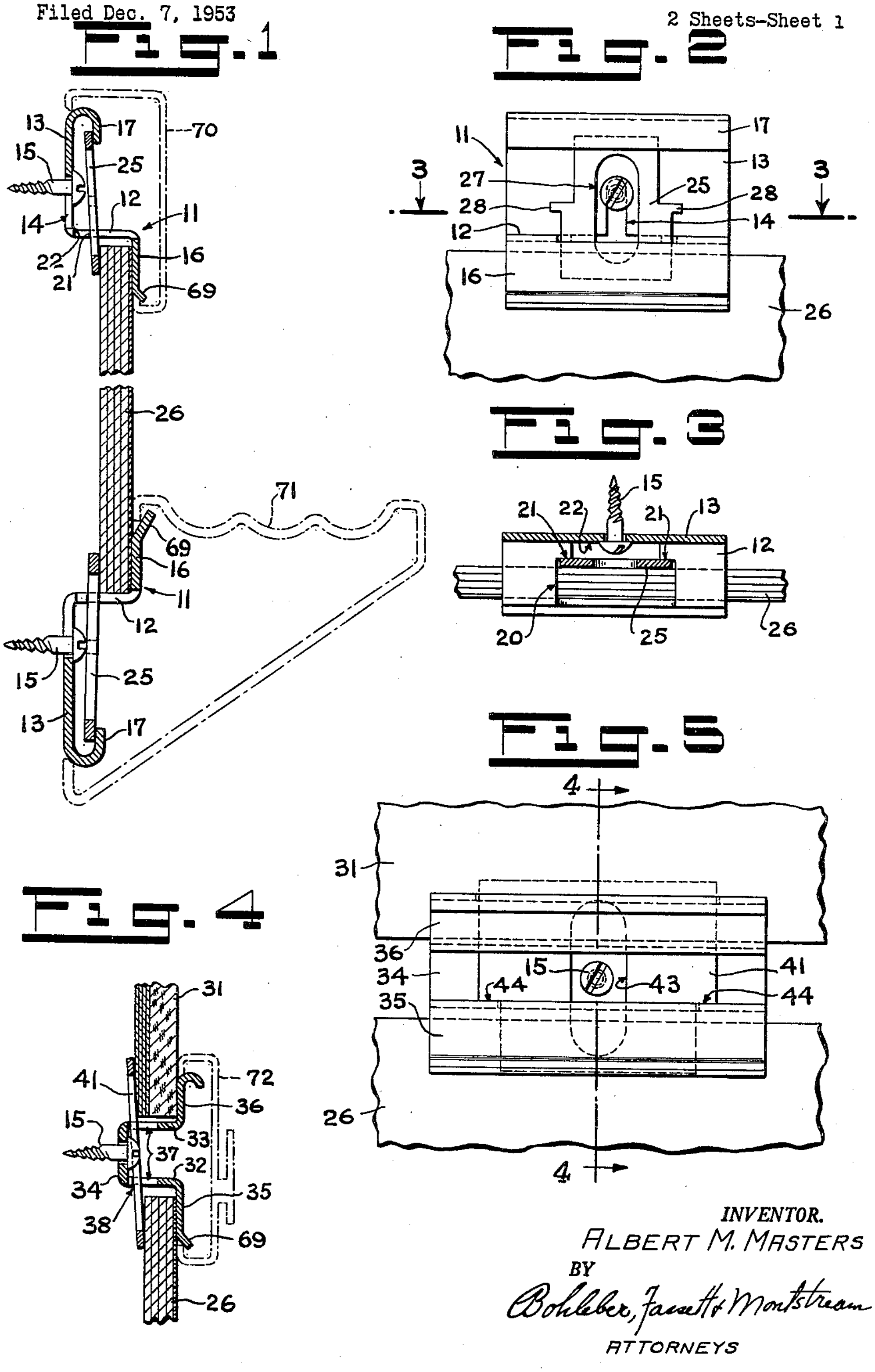
FIGURE 1 is a vertical section through an assembly of a chalkboard and mounting means.
FIGURE 2 is a front view of a mounting means of the assembly of FIGURE 1.
FIGURE 3 is a section taken on line 3—3 of FIGURE 2 showing particularly the ledge of the mounting means.
FIGURE 4 is a vertical section through an assemlby of chalkboard and a corkboard thereabove and the mounting means therefor taken on line 4—4 of FIGURE 5.
FIGURE 5 is a front view of a mounting means for the assembly of FIGURE 4.

The mounting means of FIGURES 1–3 includes a securing means or member 11 having a ledge 12. The securing means at the top and bottom may be the same or the lower securing means may be longer as shown although it is the same in all other respects. The rear edge of the ledge carries a vertical rear flange 13 having any suitable provision for securing the same to a wall, the provision shown being a hole or slot or hole means 14 therein for receiving a screw or bolt 15 which is screwed into the wall. The front edge of the ledge carries a vertical front flange 16 extending in the opposite direction from that of the rear flange. For a single board assembly a suitable locking shoulder 17 is provided that particularly shown being carried by the rear flange spaced from the ledge. Preferably this locking shoulder when carried by the rear flange is formed by bending the end edge of the rear flange forwardly and downwardly. Preferably too the locking shoulder is bent into a semicircle the purpose of which will appear more fully hereinafter. The securing means is of generally Z shape but with the ledge at right angles to the flanges and an open or unobstructed front face for the rear ledge so that the clamp may be manipulated for locking interengagement from the front or forwardly as will appear.

In the form of construction shown in FIGURES 1–3, the ledge carries a hole therethrough or recess means for a flexible clamp. The securing means also serves as a fulcrum for the clamp and preferably provides a fulcrum means at any suitable point. The rear edge or edges 21 of the hole in the ledge provide a fulcrum means in a simple way. In order to adapt the mounting means for different thicknesses of boards, the hole may be extended or be notched rearwardly to or near to the rear flange at a narrower dimension or width than the hole to provide notch means which provide fulcrum means or fulcrum shoulders 21 at the side edges of the hole and a second fulcrum means 22 spaced rearwardly from the first, formed by the rear edge of the notch.

A flexible clamp or clamp member 25 is used to firmly anchor a board 26 to the securing means or member. The clamp has a width to be received in the hole 20 in the ledge so that one end of the clamp may be inserted in back of the board. The clamp rocks or pivots on the securing means and particularly upon the fulcrum means 21 carried thereby which is located to engage the clamp between its ends and, depending upon the thickness of the chalkboard or corkboard, so that the clamp must be bent or flexed rearwardly in order that the board be clamped between the end of the clamp and the front flange 16. The top edge of the clamp may be flexed inwardly and moved longitudinally to be inserted behind the locking shoulder 17 to retain the clamp in flexed and clamping condition. The clamp should be sufficiently stiff to give a firm clamping action; for example, a clamp of 16 gage metal has been used successfully. It is clear that a wide range of flexibility or rigidity in the clamp may be used depending upon how firm a clamping action is desired.

Where the screw 15 by which the securing means is secured to a wall is underneath the clamp, the latter may have a hole or slot 27 therein so that the screw head does not interfere with the clamp, so that the screw is accessible when the clamp is in place and so that a tool may engage the end of the slot and be used to flex the clamp behind the locking shoulder. Preferably each side edge of the clamp carries a projection 28 for engaging the ledge so that the clamp will not inadvertently pass through the hole.

For a mounting means capable of clamping different thicknesses of boards, one end of the clamp is wider laterally than the other so that for a relatively thinner board the wider end of the clamp is inserted in the hole and it engages the fulcrum means formed by the fulcrum shoulders 21. For a thicker board the clamp is turned around so that the narrower end enters the hole 20 and the notch to engage the fulcrum means formed by the rear edge 22 of the notch.

In mounting a chalkboard or corkboard to a wall a series of the securing means or members 11 as shown in FIGURES 1 to 3 are secured to the wall at the desired level for the bottom of the board and also at any vertical edge of the board which does not have an abutting board as will be described hereinafter. A chalk line may be used to mark a line for the location of the screws which secure the same to the wall. The series of securing means along the bottom of the board may be spaced about twelve inches apart and those along the vertical edge or edges may be spaced about eighteen inches apart. Each securing means is secured to the wall in any suitable manner such as by a screw.

Preferably two or more boards are assembled in abutting relation in which case the securing means or members are secured to the wall along the edge of the board which does not have another board abutting thereagainst. The board or boards are placed on the ledges of the bottom row of securing means and the vertical edge is pushed behind the front flanges of the vertically located securing means. A series of securing means are then secured to the wall along the top edge of the board with the front flange overhanging the face of the board. For abutting boards the second board is mounted upon the ledges of the bottom row of securing means and pushed behind the front flanges of the vertical securing means or clips after which a series of securing means or clips are secured to the wall along the top edge of the second board with the front flanges overlying the face of the board. The abutting edges of the two boards are adjusted so that the abutting edges match. It may be necessary to tilt one or both boards or use blocks or shims on the ledge of a lower securing means or clip in order to bring the abutting edges into contact along the full length of the vertical edges. When this adjustment has been made glue is applied to the abutting edges of the boards and they are pushed together.

A flexible clamp or clamp member 25 is now inserted through the hole 20 in the ledge 12 of each of the series of securing means 11 and in the back of the rear face of the board 26. The projections 28 prevent the clamp from inadvertently going through the hole. By taking a pair of pliers and inserting one arm thereof in the hole 27 in the flexible clamp and the other arm engaging the rounded edge formed by shoulder 17 of the rear flange and squeezing the pliers, the clamp is sprung or flexed inwardly or rearwardly and shifted longitudinally or in a direction so that the edge of the clamp engages in back of the locking shoulder 17. The center portion of the clamp between its ends engages the fulcrum means 21 and the clamp in being flexed into position and held in flexed condition thereby resiliently or flexibly clamps the board between an end of the clamp and the inner face of the front flange 16 of the securing means.

FIGURES 4 and 5 show mounting means for an assembly of chalkboard 26 and corkboard 31 in which the latter is mounted adjacent to and above the chalkboard. The securing means has a pair of spaced ledges including a lower ledge 32 and an upper ledge 33, the rear edges of which are integral or connect with a rear flange 34. The rear flange is secured to a wall in any suitable manner, the construction shown including a hole through which a screw 15 passes. A lower front flange 35 extends from the front edge of the lower ledge and an upper front flange 36 extends from the upper ledge, the flanges extending in opposite directions. Each ledge has a hole 37 to receive or pass a clamp into clamping position. A clamp pivots or rocks on the securing means or member and it is convenient to provide the same with fulcrum means which fulcrum means is preferably provided by an edge 38 of the hole 37 carried by the lower ledge 32.

A flexible clamp or clamp member 41 is received in the holes in the ledges and pivots or rocks on the securing means, and particularly on the fulcrum means 38 between its ends. The lower end of the clamp engages the back of the chalkboard 26 so that when the clamp is flexed, this board is clamped between the lower end of the clamp and the lower front flange 35 of the securing means. The clamp is long enough so that it extends above the upper ledge 33 and for clamping convenience may extend above the end of the upper front flange 36. A corkboard 31 is forced between the upper end of the clamp and the upper front flange which flexes the clamp rearwardly upon the fulcrum means so that the chalkboard and the corkboard are both clamped in position. In this double board assembly the second or corkboard 31 provides the locking shoulder or means which flexes the clamp and holds the clamp in flexed condition. The clamp may have a hole 43 therein which reduces the stiffness of the clamp and also exposes the screw 15. The clamp may have shoulders 44 which prevent the clamp from inadvertently passing through the hole in the ledge.

Figure 6:
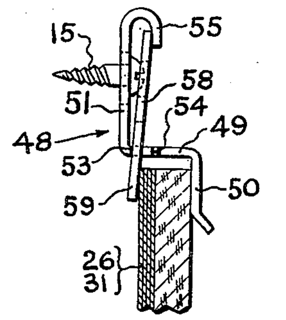
FIGURE 6 is an end view of another form of mounting means clamping a board.
Figure 7:
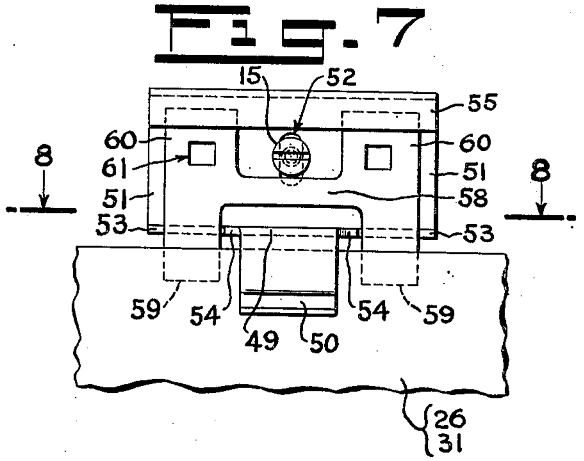
FIGURE 7 is a front view of the mounting means of FIGURE 6.
Figure 8:
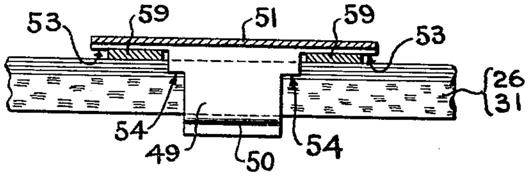
FIGURE 8 is a section taken on line 8—8 of FIGURE 7 showing the ledge of the mounting means.

In the construction of mounting means of FIGURES 6 and 7 a securing means or member 48 provides a ledge 49 having front and rear edges from the front edge of which extends a vertical front flange 50 and from the rear edge of which extends a vertical rear flange 51. A screw 15 passing through a slot 52 in the rear flange secures the securing means to a wall. A clamp pivots or rocks on the securing means and it is convenient to provide fulcrum means on the securing means which preferably is provided by a pair of fulcrum shoulders 53 formed by making the forward portion of the ledge narrower than the rear portion whereby the rear portion is of less transverse depth than the forward portion, the forward edges of the rear portion forming the fulcrum means. In order to adapt the mounting means for a board of narrower thickness, the securing means or ledge may provide a second fulcrum means 54 farther forward by providing the ledge with an intermediate portion wider than the forward portion and narrower than the rear portion and of greater depth or distance from the rear flange than said rear portion with the foward edges of said intermediate portion forming said second fulcrum means. For a single board mounting means the rear flange may carry a locking shoulder 55 spaced from the ledge and the locking shoulder illustrated is like that of FIGURES 1 to 3.

The flexible clamp or clamp member 58 used with the securing means or member of FIGURES 6 and 7 straddles the ledge of the securing means and has a pair of arms 59 which are relatively narrow and spaced apart a distance to permit said arms to straddle the intermediate portion of the ledge and engage the first fulcrum means for a relatively thick board such as a corkboard. The other end of the clamp has wider arms 60 spaced a lesser distance apart so that the clamp may be turned around whereupon these arms straddle the forward portion of the ledge and engage the forward fulcrum means 54 and adapt the mounting means to effectively secure or clamp a thinner board such as a chalkboard between the clamp and the front flange of the securing means. The end of the clamp is flexed rearwardly against the fulcrum means and shifted behind the locking shoulder 55 to clamp the board in place against the front flange 50. Holes 61 may be provided to receive a tool such as pliers to flex and shift the clamp to bring the edge thereof behind the locking shoulder.

Figure 9:
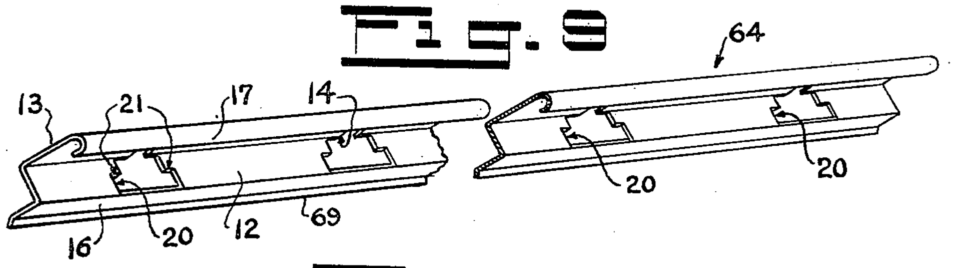
FIGURE 9 is a perspective view of a rail or frame forming a continuous securing means which uses the flexible clamp of FIGURES 1–3.
Figure 10:
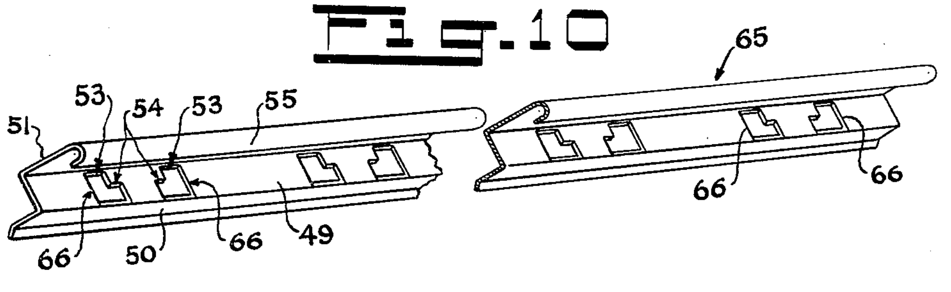
FIGURE 10 is a perspective view of a rail or frame forming a continuous securing means which uses the flexible clamp of FIGURES 6 to 8.

It is cheaper to provide a series of separate securing means; however, as shown in FIGURES 9 and 10 the securing means or member may be a continuous rail or frame 64 extending the full length of the board or boards. The continuous securing means is like the separate means in every other respect and has a ledge 12, a rear flange 13, a front flange 16, and a locking shoulder 17, as provided by the securing means of FIGURES 1 through 3. The rail has a plurality of or a series of spaced holes or recess means 20 through which the clamp extends. The holes may provide a pair of fulcrum shoulders or means. A rail 65 for the clamp of FIGURES 6 and 7, is similar to the rail 64 but has a series of recess means provided by spaced pairs of holes 66 as shown in FIGURE 10 in the ledge 49 of a rail 65. This rail or frame provides the front flange 50, rear flange 51 and locking shoulder 55.

For the rail of FIGURE 9, the clamp of FIGURES 1–3 may be mounted in each spaced hole in the rail or frame in the manner as described with respect to the separate securing means of these figures. Similarly for the rail of FIGURE 10, the clamp of FIGURES 6 and 7 is used and the board clamped in position in the manner described herein for the separate securing means. It is clear too that the double board securing means of FIGURES 4 and 5 may also be a continuous rail securing means.

In all of the single board mounting means constructions illustrated in FIGURES 1–3 and 6–7, interengaging or locking means is shown to hold the clamp or clamp member in flexed condition. The interengaging means includes a locking shoulder carried by one of the parts or members including the securing means or member and the clamp or clamp member, which is engaged by an edge carried by the other member upon flexing rearwardly or inwardly and shifting of the clamp or clamp member longitudinally to interengage the same. The constructions particularly illustrated showing the locking shoulder carried by the securing means or member are illustrative and preferred since when the locking shoulder is carried by the securing means or member one locking shoulder only need be provided in the constructions in which the clamp is reversed for different thicknesses of boards. With a board between the front flange and the clamp and the latter unflexed, the interengaging locking means are spaced from each other forwardly and longitudinally so that the clamp must be flexed inwardly or rearwardly and shifted longitudinally on the fulcrum in order to secure locking interengagement therebetween.

The securing means may have the edge 69 of the front flange angled outwardly so that a trim rail 70 or a chalk rail 71 may be snapped in place thereover and over the rounded edge formed by the locking shoulder. In FIGURE 4 the upper edge may be rounded for a concealing moulding which also serves as a map clip rail 72.

This invention is presented to fill a need for improvements in a mounting means for a board. It is understood that various modifications in structure, as well as changes in mode of operation, assembly and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A mounting means for chalkboards, corkboards and the like comprising a securing member adapted to be mounted at an edge of a board, the securing member including a ledge having front and rear edges, a rear flange extending from the rear edge of the ledge, a front flange extending from the front edge of the ledge and extending in an opposite direction from that of the rear flange, the securing member being of general Z shape with an open face forwardly for the rear flange, and fulcrum means carried by the securing member; a flexible clamp member engaging the fulcrum means between the ends of the clamp member and one end adapted to engage the back of a board to clamp the same against the front flange; and interengaging means including a locking shoulder carried by one of the members spaced from the ledge when the members are together and an edge carried by the other member said end edge being engageable with the locking shoulder between said shoulder and said member having said shoulder to cause said clamp member to flex about said fulcrum to clamp said board between the front flange and the said one end of the clamping member.

2. A mounting means for chalkboards, corkboards and the like comprising a securing member adapted to be mounted at an edge of a board, the securing member including a ledge having front and rear edges, a rear flange extending from the rear edge, a front flange extending from the front edge in a direction opposite to that of the rear flange, the securing member being of general Z shape with an open face forwardly for the rear flange, a locking shoulder carried by the rear flange spaced from the ledge, and fulcrum means carried by the securing member; and a flexible clamp member engaging the fulcrum means between the ends of the clamp member and one end adapted to engage the back of a board to clamp the same against the front flange, and the other end of the clamp member being engageable with the locking shoulder between said shoulder and said member having said shoulder to cause said clamp member to flex about said fulcrum to clamp said board between the front flange and the said one end of the clamping member.

3. A mounting means for chalkboards, corkboards and the like comprising a securing member adapted to be mounted at an edge of a board, the securing member including a ledge having front and rear edges, rear flange means including at least one rear flange extending from the rear edge, front flange means including at least one front flange extending from the front edge in a direction opposite to that of the rear flange, the securing member being of general Z shape with an open face forwardly for the rear flange, and the ledge having at least one recess means therethrough the forward facing edge of which provides fulcrum means; and a flexible clamp member received in each recess means in the ledge and engaging the fulcrum means between the ends of the clamp member and one end adapted to engage the back of a board to clamp the same against the front flange, and interengaging means including a locking shoulder carried by one of the parts including the rear flange and the clamp member spaced from the ledge when the members are together and an end edge carried by the other part, said end edge being engageable with the locking shoulder between said shoulder and said member having said shoulder to cause said clamp member to flex about said fulcrum to clamp said board between the front flange and the said one end of the clamping member.

4. A mounting means for chalkboards, corkboards and the like as in claim 3 in which the locking shoulder is carried by the rear flange means, and the interengaging end is carried by the clamp member for engaging behind the locking shoulder.

5. A mounting means for chalkboards, corkboards and the like comprising a securing member adapted to be mounted at an edge of a board, the securing member including a ledge having front and rear edges, a rear flange extending from the rear edge, a front flange extending from the front edge in a direction opposite to that of the rear flange, the securing member being of general Z shape with an open face forwardly for the rear flange, and the ledge having at least one hole therethrough the forward facing edge of which provides fulcrum means; and a flexible clamp received in each hole in the ledge and engaging the fulcrum means between the ends of the clamp and one end adapted to engage the back of a board to clamp the same against the front flange, and interengaging means including a locking shoulder carried by one of the parts including the rear flange and the clamp member spaced from the ledge when the members are together and an end edge carried by the other part, said end edge being engageable with the locking shoulder between said shoulder and said member having said shoulder to cause said clamp member to flex about said fulcrum to clamp said board between the front flange and the said one end of the clamping member, and a projection on each side of the clamp at the midsection thereof to engage the ledge to prevent the clamp from passing through the hole.

6. A mounting means for chalkboards, corkboards and the like comprising a secured member adapted to be mounted at an edge of a board, the securing member including a ledge having front and rear edges, a rear flange extending from the rear edge, a front flange extending from the front edge in a direction opposite to that of the rear flange, the securing member being of general Z shape with an open face forwardly for the rear flange, and the ledge having at least one recess means therethrough and the recess means having notch means of narrower width laterally than the recess means and extending toward the rear flange, the rear edges of the recess means and the notch means providing a pair of spaced fulcrum means; and a flexible clamp received in each recess means in the ledge and engaging the fulcrum means between the ends of the clamp and one end adapted to engage the back of a board to clamp the same against the front flange and the other end adapted to be flexed and held in flexed condition, interengaging means including a locking shoulder carried by one of the parts including the rear flange and the clamp member spaced from the ledge when the members are together and an end edge carried by the other part, said end edge being engageable with the locking shoulder between said shoulder and said member having said shoulder to cause said clamp member to flex about said fulcrum to clamp said board between the front flange and the said one end of the clamping member, and one end of the clamp having a different width from the other end whereby one end is adapted to engage one fulcrum means and the other end is adapted to engage the other fulcrum means.

7. A mounting means for chalkboards, corkboards and the like comprising securing means of relatively narrow width adapted to be mounted at an edge of a board, the securing means including a ledge having front and rear edges, a rear flange extending from the rear edge, a front flange extending from the front edge in a direction opposite to that of the rear flange, a locking shoulder carried by the rear flange spaced from the ledge, and the ledge having a forward narrow portion and a rear wide portion the front edges of said wide portion providing a fulcrum means; and a flexible clamp having a pair of arms at one end thereof straddling the ledge and engaging the fulcrum means between the ends of the clamp, the arms adapted to engage the back of a board to clamp the same against the front flange and the other end of the clamp engaging behind the locking shoulder carried by the rear flange.

8. A mounting means for chalkboards, corkboards and the like comprising a securing member of relatively narrow width adapted to be mounted at an edge of a board, the securing member including a ledge having front and rear edges, a rear flange extending from the rear edge, a front flange extending from the front edge in a direction opposite to that of the rear flange, the securing member being of general Z shape with an open face forwardly for the rear flange, a locking shoulder carried by the rear flange spaced from the ledge, and the ledge having a wide portion and a narrower intermediate portion and a forward portion narrower than the intermediate portion, the front edges of the wide portion and the front edges of the intermediate portion providing a pair of fulcrum means; and a flexible clamp having a pair of arms at each end thereof adapted to straddle the ledge and engaging the fulcrum means between the ends of the clamp and one end adapted to engage the back of a board to clamp the same against the front flange and the other end engaging behind the shoulder carried by the rear flange, and the pair of arms at one end of the clamp being spaced from each other a different distance than the pair of arms at the other end whereby one pair of arms is adapated to engage one fulcrum means and the other pair of arms is adapted to engage the other fulcrum means.

9. A mounting means for chalkboards, corkboards and the like comprising a securing member having substantial length adapted to be mounted at an edge of a board, the securing member including a ledge having front and rear edges, a rear flange extending from the rear edge, a front flange extending from the front edge in a direction opposite to that of the rear flange, the ledge having a plurality of spaced recess means therethrough, the securing member being of general Z shape with an open face forwardly for the rear flange, and a locking shoulder carried by the rear flange spaced from the ledge and at least at each recess means, a forward facing edge of each recess means providing fulcrum means; and a flexible clamp received in each recess means in the ledge and engaging the fulcrum means between the ends of the clamp and one end adapted to engage the back of a board to clamp the same against the front flange and the other end engaging behind the shoulder carried by the rear flange said end edge being engageable with the locking shoulder between said shoulder and said member having said shoulder to cause said clamp member to flex about said fulcrum to clamp said board between the front flange and the said one end of the clamping member.

References Cited in the file of this patent

UNITED STATES PATENTS

| | | |
|---|---|---|
| 987,076 | Knoblauch | Mar. 14, 1911 |
| 1,000,819 | Kleinhans | Aug. 15, 1911 |
| 1,496,581 | Kusterle | June 3, 1924 |
| 1,873,350 | Smith | Aug. 23, 1932 |
| 2,094,551 | Peck et al. | Sept. 28, 1937 |
| 2,283,272 | Lowry | May 19, 1942 |
| 2,286,976 | Roberts | June 16, 1942 |
| 2,300,248 | Elnett | Oct. 27, 1942 |
| 2,319,278 | Urbain | May 18, 1943 |
| 2,338,146 | Urbain | Jan. 4, 1944 |
| 2,651,852 | Urbain | Sept. 15, 1953 |
| 2,793,725 | Allison | May 28, 1957 |